United States Patent
Bhogal et al.

(10) Patent No.: US 8,640,177 B2
(45) Date of Patent: Jan. 28, 2014

(54) INTERACTIVE DVR SYSTEM

(75) Inventors: Kulvir Singh Bhogal, Fort Worth, TX (US); Lydia M. Do, Raleigh, NC (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/537,698

(22) Filed: Jun. 29, 2012

(65) Prior Publication Data

US 2014/0007169 A1 Jan. 2, 2014

(51) Int. Cl.
*H04N 7/173* (2011.01)

(52) U.S. Cl.
USPC ............... 725/92; 725/82; 709/219

(58) Field of Classification Search
USPC ............ 725/80–82, 85, 131–134, 139–142, 725/151–153; 709/217–232
See application file for complete search history.

(56) References Cited

U.S. PATENT DOCUMENTS

| | | | | |
|---|---|---|---|---|
| 5,652,863 | A * | 7/1997 | Asensio et al. | 711/173 |
| 5,829,045 | A * | 10/1998 | Motoyama | 711/162 |
| 6,247,126 | B1 * | 6/2001 | Beelitz et al. | 713/1 |
| 2002/0059621 | A1 * | 5/2002 | Thomas et al. | 725/87 |
| 2003/0154485 | A1 * | 8/2003 | Johnson et al. | 725/89 |
| 2007/0058924 | A1 | 3/2007 | Yeh | |
| 2007/0061441 | A1 | 3/2007 | Landis | |
| 2009/0317065 | A1 | 12/2009 | Fyock | |
| 2010/0272413 | A1 | 10/2010 | Bhogal | |
| 2011/0052157 | A1 | 3/2011 | Pickelsimer | |

FOREIGN PATENT DOCUMENTS

EP   1763174   3/2007

* cited by examiner

*Primary Examiner* — Annan Shang
(74) *Attorney, Agent, or Firm* — David A. Mims, Jr.; Robert V. Wilder

(57) ABSTRACT

A method, program product and system are provided to enable a new software interface and program to manage DVR content including methods for separating storage partitions, e.g. by user and also on a shared basis on local media. The partitions may either be logical or physical partitions and may be allocated differently based on the user. In an exemplary illustration, a shared partition/buffer is used for multiple users who may each initiate the recording of various shows or recordings which may be shared by other users. The interactive shared partition is used to allow multi-room coordination, messaging, content cloning, user-to-user notifications, and specific user to user messaging facilities, with the capability of setting notifications for other parties on the addition/removal of content, "pushing" recommendations of shows to other users of a shared DVR system, and allowing messages to be left to other users regarding content.

20 Claims, 5 Drawing Sheets

RECORDED TV
BY DATE  BY TITLE  BY USER  LAST ACCESSED  MORE INFO

| USER | % ALLOCATED | % USED | LAST ACCESSED | MORE INFO |
|---|---|---|---|---|
| KULVIR | 25 | 20 | JUNE 06 | OPEN |
| JIM | 25 | 15 | JULY 01 | CONTENT LOCKED |
| RICK | 25 | 10 | JUNE 30 | CONTENT LOCKED |
| LYDIA | 15 | 5 | APRIL 05 | OPEN |
| SHARED | 10 | 20 | JULY 01 | OPEN |

| SHARED RECORDED TV |||||||
|---|---|---|---|---|---|---|
| BY DATE   BY TITLE   BY USER   ADD RECORDING   RECOMMEND   MESSAGE ← 503 ||||||
| SHOWS | RECORDED BY | LAST ACCESS | RECOMMENDED FOR | KEEP UNTIL | MESSAGE |
| PROGRAM A | KULVIR | JUNE 06 | LYDIA | JUL 15 | MESSAGE |
| PROGRAM B | JIM | JULY 01 | RICK | JUL 30 | NONE |
| PROGRAM C | RICK | JUNE 30 | ALL | JUL 15 | MESSAGE |
| PROGRAM D | LYDIA | APR 05 | LYDIA | JUL 21 | NONE |

| RECORDED TV |||||
|---|---|---|---|---|
| BY DATE   BY TITLE   BY USER   LAST ACCESSED   MORE INFO |||||
| USER | % ALLOCATED | % USED | LAST ACCESSED | MORE INFO |
| KULVIR | 25 | 20 | JUNE 06 | OPEN |
| JIM | 25 | 15 | JULY 01 | CONTENT LOCKED |
| RICK | 25 | 10 | JUNE 30 | CONTENT LOCKED |
| LYDIA | 15 | 5 | APRIL 05 | OPEN |
| SHARED | 10 | 20 | JULY 01 | OPEN |

INTERACTIVE DVR SYSTEM

FIELD OF THE INVENTION

The present invention relates generally to recording systems and more particularly to a system and methodology for enabling user interactions with other users in a DVR system.

BACKGROUND OF THE INVENTION

A digital video recorder (DVR) or personal video recorder (PVR) is a device that records video in a digital format to a disk drive or other medium. The term includes stand-alone set-top boxes and software for personal computers which enables video capture and playback to and from disk or other storage devices.

Digital Video Recording allows content capture for later viewing, but DVR devices currently lack the capability for sophisticated content management. A DVR system provides for multiple members of a family or other group or network of users to record, view, delete, and otherwise manage content recorded on a storage device. An example of such a multi-user DVR network is disclosed in Patent Application Publication US 2010/0272413 which is assigned to the assignee of the present application and included herein by reference.

The capacity of the DVR storage device and the recording mode (quality) determine the number of programs that can simultaneously be stored within the DVR. With multiple viewers having a variety of interests, the DVR storage device can reach capacity very quickly, and as such, managing the deletion of content that has already been viewed, or is no longer of interest becomes imperative. One does not, however, want to inadvertently delete content recorded by another or pending viewing by another interested party.

Thus, there is a need for an improved system and methodology for enabling user participation and coordination in managing DVR storage and DVR file retention systems.

SUMMARY OF THE INVENTION

A method, program product and system are provided to enable a new software interface and program to manage DVR content. Specifically, methods of separating storage partitions, e.g. by user and also on a shared basis on local media are disclosed. The partitions may either be logical or physical partitions and may be allocated differently based on the user. In the exemplary illustration, a shared partition/buffer is used for multiple users who may each initiate the recording of various shows or recordings. In one example, the creation of user partition(s) and shared partition(s) is provided including how the partitions can be subsequently managed and how content can be moved or cloned from partition to partition. In addition, an interactive shared partition is used that allows multi-room coordination, messaging, content cloning, user-to-user notifications, and specific user to user messaging facilities, with the capability of setting notifications for other parties on the addition/removal of content, "pushing" recommendations of shows to other users of a shared DVR system, and allowing messages to be left to other users regarding content.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

It is noted that devices which are shown in block or schematic form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The present disclosure provides a novel system for facilitating efficient content storage on the DVR, in ways transcending other content management systems on computational devices. Included in this management are devices for providing viewing recommendations between household members, corporate team members or others sharing a common device.

Current DVR controls do not convey any information as to who initiated the recording, ownership of the recording, or whether the recorded show has been viewed. Recording shows creates a storage management issue which does not scale well as the number of people who share the local media grows. This problem becomes increasingly challenging with the recent introduction of multi-room DVR capabilities where multiple parties may watch content from an individual DVR simultaneously in multiple rooms, but the multiple users do not know what the others have already viewed. This may lead to deletion of content that one or more users still desire to view, as well as keeping of content that has already been viewed by all interested parties. The present application provides a system that eliminates the above-noted shortcomings of current systems.

In the disclosed example, each user is allocated a partition on the local media system, where the partition may be allocated as a common or shared partition/buffer. The system may track user content by (1) associating default interaction to the shared partition/buffer, (2) requiring UID (user ID) log-on/off into the local media system. A user may log on at any time, and any interaction is associated with that user until they log off and another user is logged on. This setting may be done once or can be applied individually for actions such as scheduling, recording, deleting, etc., depending on the design of the local media storage device. Tags/keywords may also be assigned to different users as an alternative to requiring UID log-on/off.

The disclosed system also allows for the "pushing" of recommendations of shows to other users thereby allowing for multi-room coordination where access by user or room can be tracked and displayed. The system also allows for content that is recommended to others to be pushed/cloned to their partition, and enabling a user to leave messages for other users regarding content on the shared partition.

The system also includes mobile device connectivity which allows for application based services for the user. Each user can log into his or her DVR/local media "app", then select shows and clone content onto their mobile device or stream content off of the DVR. Since, as disclosed, content is now identified by partition and user, a user can view his or her own content and also shared content among the household users. However, the same access policies for the DVR may be applied here where a user may be restricted from viewing another user's shows unless it resides in an open or shared partition.

Figure 1:
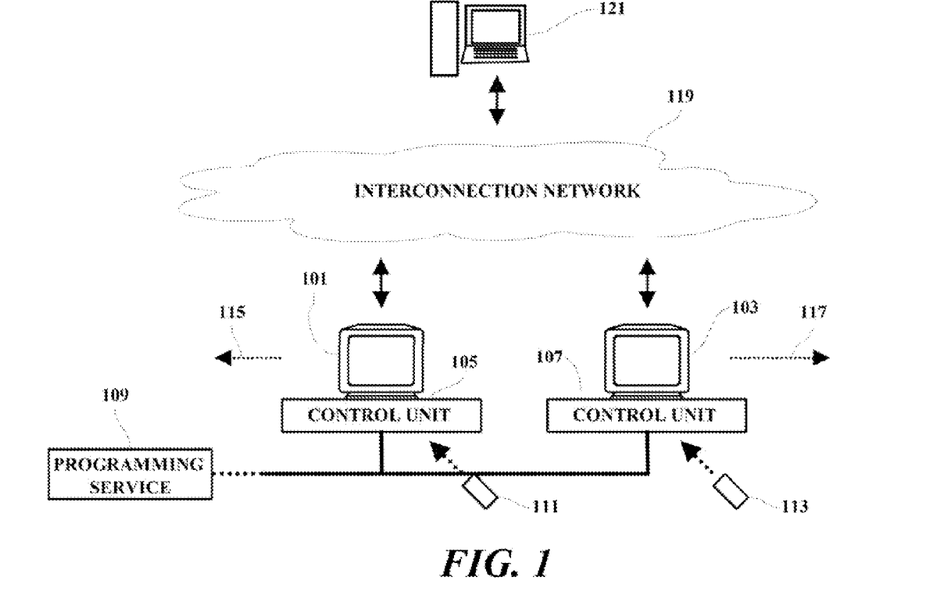
FIG. 1 is an illustration showing an exemplary environment in which the present invention may be implemented.

With specific reference to the drawings, in FIG. 1 there is shown a first display unit 101 and a second display unit 103. The display units are typically located in different locations such as different rooms in a home or different offices in an office building or other facility. Each display unit 101 and 103 is connected to a control unit 105 and 107, respectively, which are, in turn, arranged for connection through an interconnection network 119, such as the Internet, to one or more server devices 121. The control units 105 and 107 in the illustrated example are digital video control (DVR) control units which are arranged to receive and selectively record programming from a programming service. The DVR control units 105 and 107 are also commonly connected to a video programming service 109 through a satellite receiver dish or a cable connection to receive programming from the programming service 109. Each control unit is also arranged to receive user input through respective user remote control units 111 and 113 which may be implemented through infrared, RF or other transmitting devices. Although only two display units 101 and 103 are illustrated, it is understood that the units 101 and 103 may be only two of a series of display units connected together in a DVR network located within a household or building or neighborhood as illustrated at 115 and 117.

Figure 2:
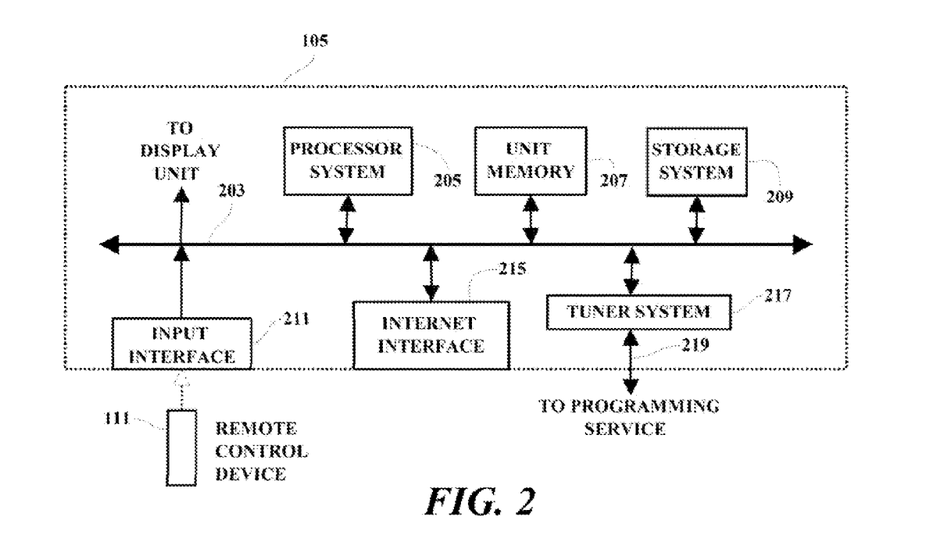
FIG. 2 is a schematic block diagram showing several of the major components of a digital video recorder control unit in an exemplary implementation of the present invention.

FIG. 2 shows several of the major components of an exemplary DVR control unit 105. The control unit 105 includes a main bus 203 to which is connected a processor system 205 which includes one or more processor devices, a unit memory 207, a storage system 209, and an input interface 211. The main bus 203 is also coupled 219 to a video or cable service through a tuner system 217. The input interface 211 also includes, for example, infrared or RF circuitry arranged for communicating with a hand-held remote control unit 111 through which a user is enabled to interface with the control units 105 and 107 to select programs to be recorded and played on one or more of the monitors or display units 101 and 103. The tuner system 217 is included in each of the control units 101-103 and may include one or more individual independent tuners. The tuners are operable to tune-in to a user selected channel in order to play or record video content being presented on that channel by the video service provider or programming service 109. Most currently available tuner systems are comprised of two tuners although it is possible to have more than two. With two tuners, a control unit user is able to play one channel while recording another or record two channels at the same time for example. The system also includes an interconnection network interface 215 which is arranged to enable connection through a network such as the Internet, to remotely located servers such as server 121. The remote server 121 may, for example, provide programming information in the form of an electronic programming guide (EPG) or other supplemental information related to the shows or programs being received from the programming service 109. The EPG may also be provided directly from the programming service 109. The control units 105 and 107 are arranged to be connected to other devices or program products, such as optical or magnetic disks or flash memory devices (not shown), which may be used to program the control units 105 and 107 to perform in accordance with the teachings of the present disclosure. The control units 105 and 107 may also be programmed to perform in accordance with the flowchart processes disclosed herein through program product downloads received from remote servers such as server 121 through the Internet Interface 215.

Figure 3:
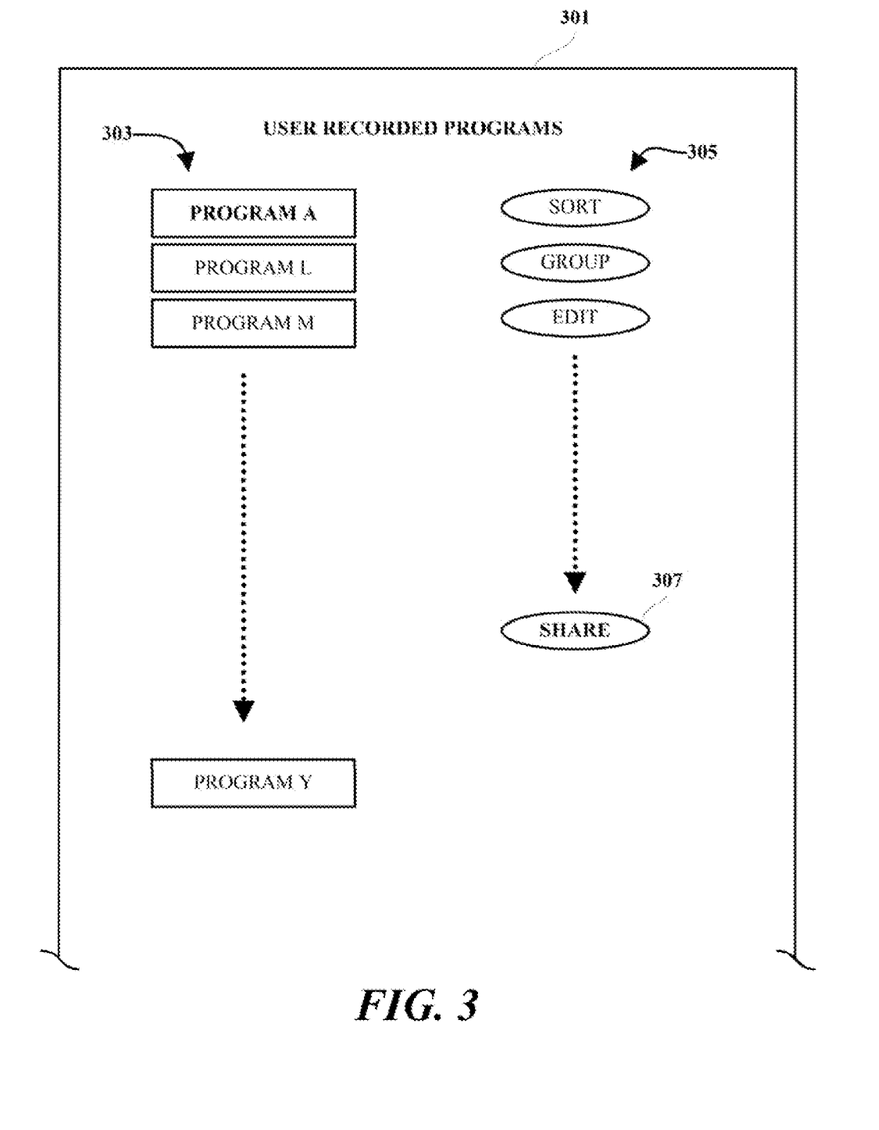
FIG. 3 is an illustration of an exemplary recorded program menu useful in explaining an operation of the present invention.

In FIG. 3, in the User Recorded Programs listing 301, the user can navigate to the "Shared" partition 307 to interact with recordings on the shared partition of stored programs or shows. The user may typically "navigate" through menus to select and actuate selected functions by operating a navigation device on a remote control unit to highlight a selected item and then depress an actuate button on the remote unit 111, 113 while the selected function is highlighted. The User Recorded Programs listing 301 includes a listing of programs that have already been recorded 303 by a user and also a listing of functions 305 that can be performed relative to the listed programs 303. One of the functions that can be selected by a user is the "Share" function 307 by which a user is enabled to share a recorded program with other users in the DVR network 115, 117. A user may elect to share a recorded program by highlighting the program to be shared, such as "Program A", and then actuating the "Share" button 307 using a remote control unit 111, 113.

Figure 4:
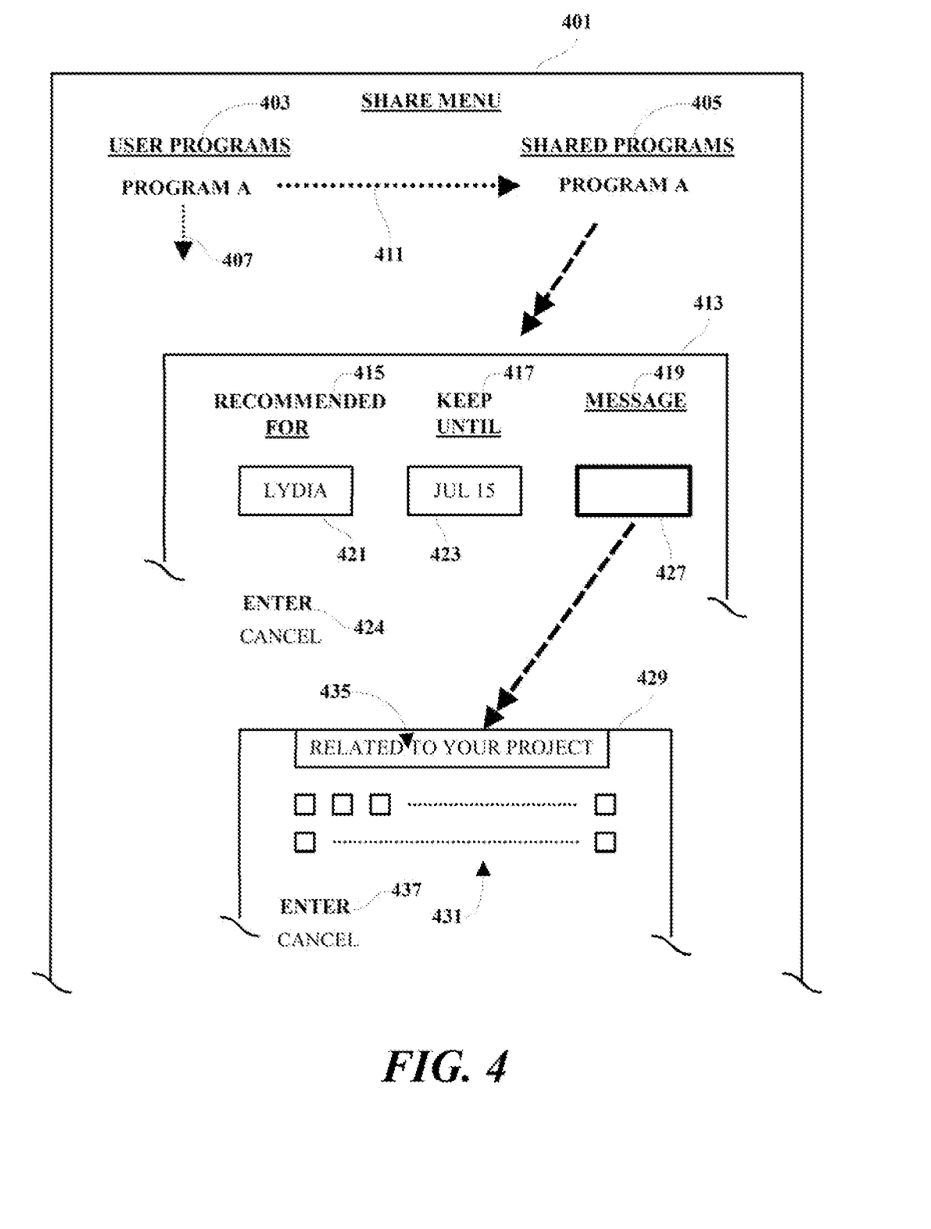
FIG. 4 is an example of a share menu options screen which may be displayed to and completed by a user in an implementation of the present invention.

As shown in FIG. 4, the "Share" menu 401 enables a user to move 411 Program A in the example, from User Programs 403 to the second column Shared Programs 405. A window 413 will then appear to allow the user to make further selections with regard to the Shared Program A. For example, the user may indicate for whom 415 the selected Program A is recommended 421, the "Keep" time 417 or length of time that the program will be kept in storage 423. The user may also select to leave a message 419 for the recipient 421 of the recording by highlighting a message block 427 for example, at which time another window will appear 429 to enable the user to input a message for the recipient. At that point, the user may choose not to attach a message to the selected program and highlight and actuate the ENTER button 437 to save all of the entered information without a message and the message block 427 will remain blank or indicate "no message" or "none". If the user chooses to enter a message, the message may be a typed-in custom message or the message may be selected from a listing of predetermined messages (not shown) or a combination of both. In the illustration, the message input screen 429 may present an alpha-numeric "soft" keyboard 431 which enables the user to select the text of the message 435 to be associated with the shared Program A and posted for access by the recipient through the Shared partition of storage. The user may then select and actuate the ENTER button 437 to complete the transfer of the selected Program A and the associated message 435 from the user's storage space to the recipient Lydia on the Shared storage space for the DVR network. The message will then appear in the message block 427 of the share menu screen 401. For example, as illustrated, the user may select the message "Related to your Project" 435 as shown to indicate to the recipient Lydia that Program A is relevant to a project that the user knows Lydia is working on. Lydia may then access the recording and the associated message on the shared partition and play the recording Program A at her convenience and on her own or any other DVR display unit in the DVR network.

Figure 5:
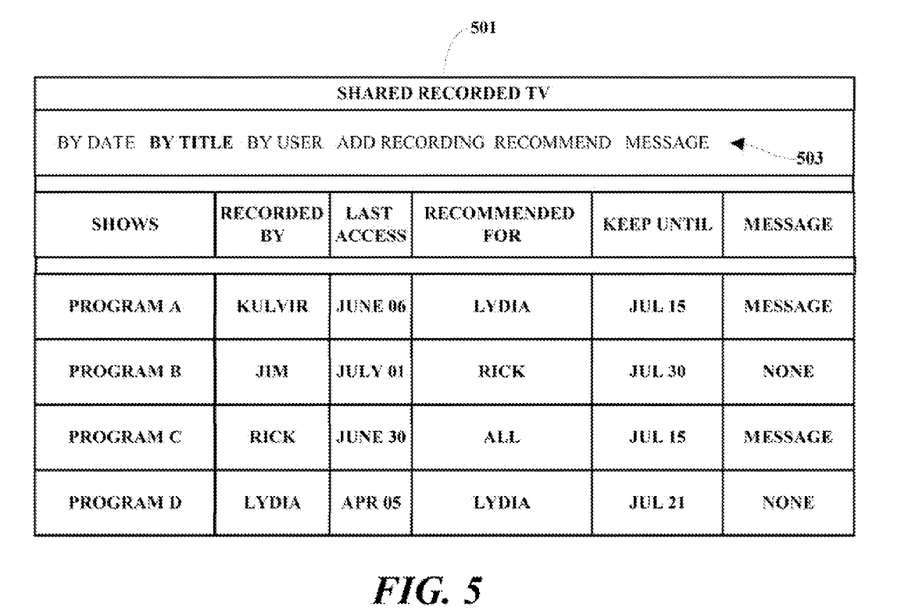
FIG. 5 is an illustration of an exemplary shared recorded TV Listing for an exemplary multi-user DVR system.

As shown in FIG. 5, a Shared Recorded TV screen 501 may be accessed by the users of the DVR system to find out what programs have been recorded or added to the shared partition. As illustrated in the example, the Shared Recorded TV Screen 501 includes, inter alia, such information as what shows have been recorded, by whom, when the last access was, for whom each show has been recommended, the "keep" time or when each recording will be deleted or moved from the shared partition to an archived file, and also whether or not there is any message associated with each of the programs. The display 501 may be displayed to any of the users on the DVR network and arranged by any of the sub-headings listed 503. For example, as shown in FIG. 5, Jim has recommended that Rick view the show "PROGRAM B" and has recorded the show for Rick. That show will be kept on the shared partition until July 30. When Rick logs in, he may have options such as: (1) to push the copy of that show to his user partition; (2) to view it on the shared partition; (3) to delete the show on the shared partition; and/or (4) to leave a message for Jim under "Shared TV"—"Messages".

Figure 6:
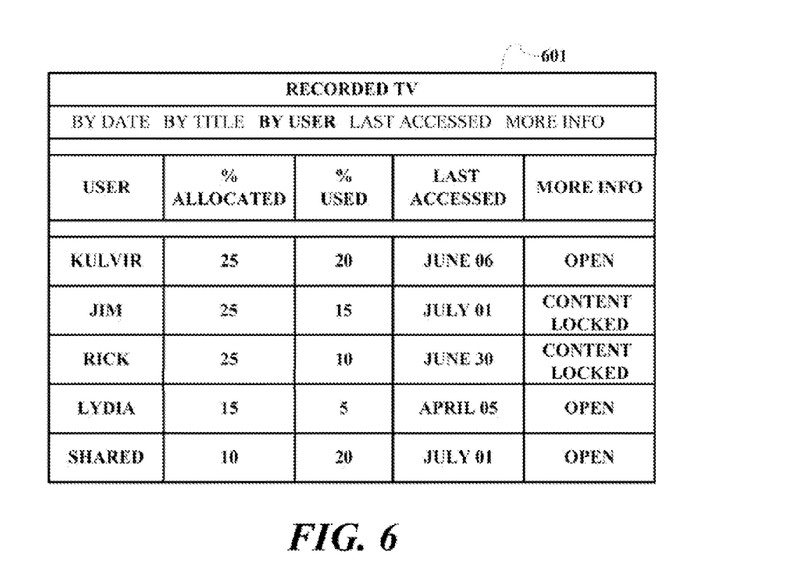
FIG. 6 is an exemplary recorded TV usage chart for a multi-user DVR system.

In FIG. 6, the Recorded TV menu 601 shows which partitions exist on the local media storage device by user, the percentage of space allocated by user, the percentage of space occupied or available on each user's partition, and when the last read/write access occurred. Each user may optionally have the ability to lock access or allow for open policy with regard to content viewing/management of their partition. FIG. 6 also illustrates several additional features. Locked partitions do not allow Look/Read/Write access. Content cannot be viewed by other users and only the owner of the partition can manage the content on that partition (i.e. view, delete, record, etc.). For Open partitions, Look/Read Access is allowed but Write access is restricted. Content can be viewed by other users but only the owner of the partition can write/manage the content on that partition (i.e. delete, record, etc.). Optionally, the user may designate their partition from Open to Shared. A Shared partitions allows all access by all users. Content can be viewed, deleted, recorded, and hence managed by any user on the local media storage device. Content from shared partitions may be cloned onto an individual user's partition. This allows the ability for content marked for deletion on the shared partition to be replicated and saved for individual viewing.

In addition, provisions are established for Administrators/Super-Users. These users may be able to override locked partitions. This access, in one example, allows for adults/parents to monitor their children's activity or set-up parental locks on behalf of their children. This access allows for "whole" unit (e.g. across all partitions) management (i.e. deletion, recording, etc.).

The shared partition/buffer, offers an interactive framework where different users can interact with other users with regard to specific recordings. For example, one user may set a notification for other users on the addition/removal of content and the access control settings for that partition. Under the "BY USER" setting, a UID may be added or deleted and allocation of the partition may be split from the shared or open partitions to new users.

Figure 7:
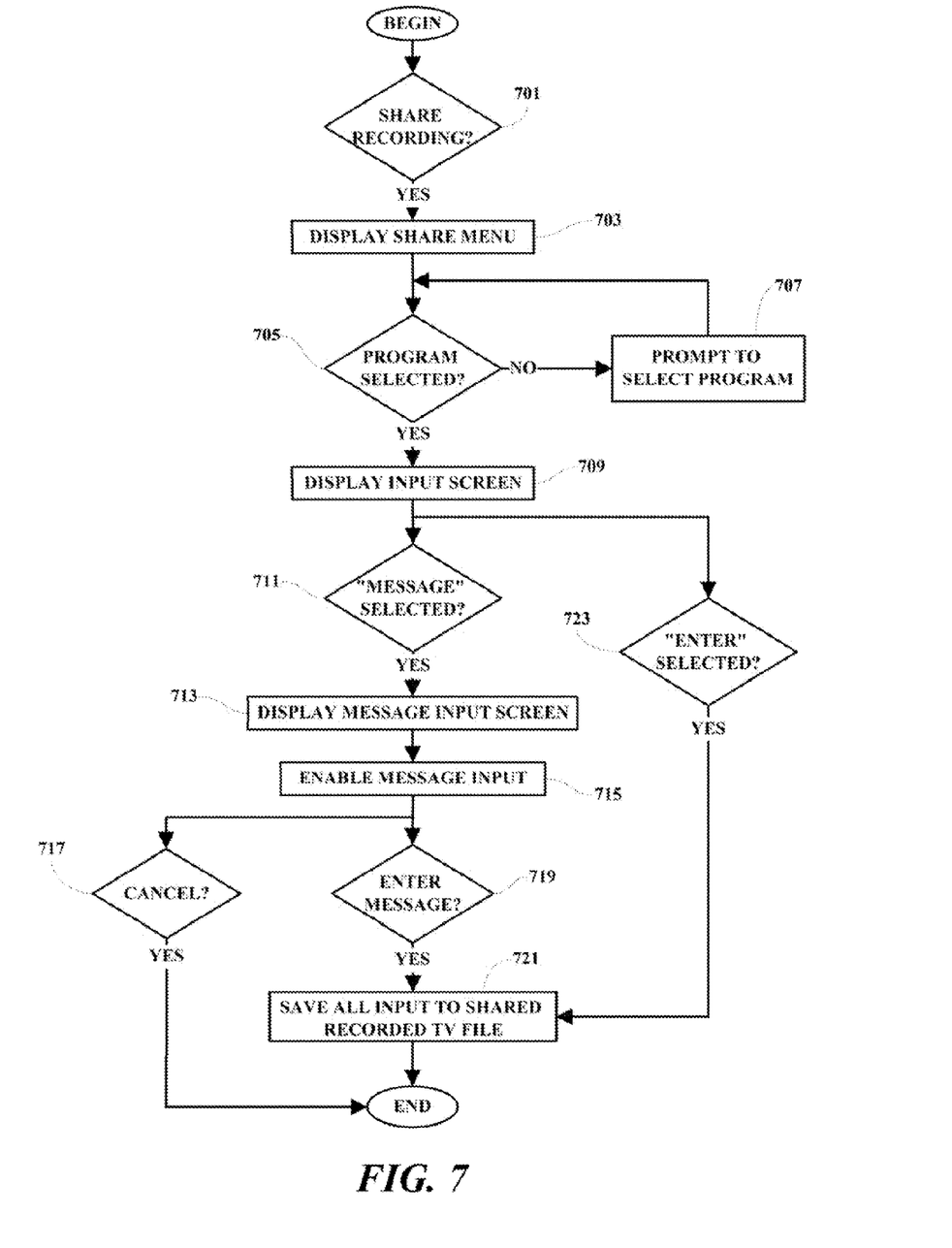
FIG. 7 is a flow chart illustrating an exemplary sequence of operations implemented in one exemplary embodiment of the present invention.

In FIG. 7, a flow diagram illustrates an exemplary operational sequence of one of the features of the present disclosure. As shown, when a user selects to share a recording 701, the share menu is displayed 703 to enable the user to select a program to be shared. A prompt screen continues to be displayed 707 until the user selects the program. When the user selects the program to be shared 705, a user input screen 401 is displayed 709. The user may then choose not to enter a message and just actuate the "ENTER" button 723 in which case all of the input information will be saved to the shared TV file 721 without a message. If the user chooses to attach a message 711, a message input screen will be presented 713 by which the user is enabled 715 to select a predetermined message as noted earlier or input a specific custom message to the person for whom the program has been recommended. At that point, the user may choose to either cancel 717 the movement of the recorded program to the shared partition of storage or enter the input message 719 and save all user input including the message to the shared recorded TV file 721 to be available for either only the recipient user or for a subset of, or all other users to access, depending upon the specific system design.

The flowchart and block diagrams illustrate the architecture, functionality, and operation of possible implementations of systems, methods and computer program products according to various embodiments of the present invention. In that regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in a computer program product, a computer storage device or a computer memory. A computer program product may include, inter alia, a computer-readable, tangible storage device(s) and computer-readable program instructions stored on the computer-readable, tangible storage device(s) in any media, including any portable or fixed, volatile or non-volatile memory media device, including CDs, RAM and "Flash" memory, or other semiconductor, optical, magnetic or other memory media capable of storing code. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for managing recorded program sharing in a digital video recorder (DVR) system, said DVR system including a plurality of users commonly connected to a video program source, said method comprising:
   assigning a first partition area of storage in said DVR system to a first user of said plurality of users for storing recorded programs for said first user;
   assigning a shared partition area of storage in said DVR system, said shared partition area being accessible by all of said plurality of users, said first partition area and said shared partition area being separate storage areas of a single DVR storage device; and
   responsive to an input from said first user, transferring a video recording from said first partition area of storage to said shared partition area of storage.

2. The method as set forth in claim 1 and further including:
   responsive to a request from said first user to share a video recording in said first partition area with another user of said DVR system, providing a selection device for enabling said first user to choose a selected video recording to be transferred.

3. The method as set forth in claim 2 wherein said selection device includes displaying a share menu on a display device of said first user, said share menu including said selection device.

4. The method as set forth in claim 1 and further including:
   responsive to a request from said first user to share a video recording in said first partition area with another user of said DVR system, providing a selection device for enabling said first user to designate said another user;
   transferring said video recording from said first partition area to said shared partition area; and
   associating an identity of said another use with said transferred video recording.

5. The method as set froth in claim 4 wherein said selection device includes displaying of a share menu on a display device of said first user, said share menu including said selection device, said identity of said another user being displayed on said share menu for enabling a selection of said another user by said first user.

6. The method as set forth in claim 1 and further including:
   responsive to a request from said first user to share a video recording in said first partition area with another user of said DVR system, transferring said video recording from said first partition area to said shared partition area of storage; and
   providing a selection device for enabling said first user to designate a period of time said transferred video recording will remain on said shared partition area before being deleted.

7. The method as set froth in claim 6 wherein said selection device includes:
   displaying of a share menu on a display device of said first user, said share menu including said selection device; and
   deleting said transferred video recording after said period of time.

8. The method as set forth in claim 1 and further including:
   responsive to a request from said first user to share a video recording in said first partition area with another user of said DVR system, providing an input device for enabling said first user to create a message to be associated with said video recording;
   receiving said message from said first user;
   transferring said video recording from said first partition area to said shared partition area; and
   associating said message with said transferred video recording.

9. The method as set froth in claim 8 wherein said input device includes:
   displaying of a share menu on a display device of said first user, said share menu including said input device; and
   displaying said message or a reference to said message, on a share partition content display in association with a display of an identity of said transferred video recording.

10. The method as set forth in claim 1 and further including:
    enabling said first user to choose a selected video recording to be transferred;
    enabling said first user to identify another user to whom said selected video recording is to be transferred;
    enabling said first user to input a message to be associated with said selected video recording; and
    enabling said first user to establish a save period, said save period being a time period said selected video recording is saved on said shared partition area before being deleted.

11. A computer-readable, tangible storage device(s) and computer-readable program instructions stored on the computer-readable, tangible storage device(s) for managing recorded program sharing in a digital video recorder (DVR) system, said DVR system including a plurality of users commonly connected to a video program source, the computer-readable program instructions, when executed by a processing system, being operable for implementing a method comprising:
    assigning a first partition area of storage in said DVR system to a first user of said plurality of users for storing recorded programs for said first user;
    assigning a shared partition area of storage in said DVB system, said shared partition area being accessible by all of said plurality of users, said first partition area and said shared partition area being separate storage areas of a single DVR storage device; and
    responsive to an input from said first user, transferring a video recording from said first partition area to said shared partition area.

12. The computer-readable, tangible storage device(s) and computer-readable program instructions stored on the computer-readable, tangible storage device(s) as set forth in claim 11 wherein said method further includes:
    responsive to a request from said first user to share a video recording in said first partition area with another user of said DVR system, providing a selection device for enabling said first user to choose a selected video recording to be transferred.

13. The computer-readable, tangible storage device(s) and computer-readable program instructions stored on the computer-readable, tangible storage device(s) as set forth in claim 12 wherein said selection device includes displaying a share menu on a display device of said first user, said share menu including said selection device.

14. The computer-readable, tangible storage device(s) and computer-readable program instructions stored on the computer-readable, tangible storage device(s) as set forth in claim 11 wherein said method further includes:
    responsive to a request from said first user to share a video recording in said first partition area with another user of said DVR system, providing a selection device for enabling said first user to designate said another user;
    transferring said video recording from said first partition area of storage to said shared partition area of storage; and associating an identity of said another user with said transferred video recording.

15. The computer-readable, tangible storage device(s) and computer-readable program instructions stored on the computer-readable, tangible storage device(s) as set forth in claim 14 wherein said selection device includes displaying of a share menu on a display device of said first user, said share menu including said selection device, said identity of said another user being displayed on said share menu for enabling a selection of said another user by said first user.

16. The computer-readable, tangible storage device(s) and computer-readable program instructions stored on the computer-readable, tangible storage device(s) as set forth in claim 11 wherein said method further includes:
   responsive to a request from said first user to share a video recording in said first partition area with another user of said DVR system, transferring said video recording from said first partition area to said shared partition area; and
   providing a selection device for enabling said first user to designate a period of time said transferred video recording will remain on said shared partition area before being deleted.

17. The computer-readable, tangible storage device(s) and computer-readable program instructions stored on the computer-readable, tangible storage device(s) as set forth in claim 16 wherein said method further includes;
   displaying of a share menu on a display device of said first user, said share menu including said selection device; and
   deleting said transferred video recording after said period of time.

18. The computer-readable, tangible storage device(s) and computer-readable program instructions stored on the computer-readable, tangible storage device(s) as set forth in claim 11 wherein said method further includes:
   responsive to a request from said first user to share a video recording in said first partition area with another user of said DVR system, providing an input device for enabling said first user to create a message to be associated with said video recording;
   receiving said message from said first user;
   transferring said video recording from said first partition area to said shared partition area; and
   associating said message with said transferred video recording.

19. The computer-readable tangible storage device(s) and computer-readable program instructions stored on the computer-readable, tangible storage device(s) as set forth in claim 18 wherein said method further includes:
   displaying of a share menu on a display device of said first user, said share menu including said input device; and
   displaying said message or a reference to said message, on a share partition content display in association with a display of an identity of said transferred video recording.

20. A digital video recorder (DVR) system operable for managing recorded program sharing in said DVR system, said DVR system including a plurality of users commonly connected together and to a video program source, said DVR system including:
   a distributed DVR storage system for assigning a first partition area of storage in said DVR system to a first user of said plurality of users for storing recorded programs for said first user, said processing system being further operable for assigning a shared partition area of storage in said DVR system, said shared partition area being accessible by all of said plurality of users, said distributed DVR storage system including a plurality of interconnected separate DVR storage devices, said first partition area and said shared partition area being separate storage areas of one or more of said interconnected separate DVR storage devices;
   an input device responsive to an input from said first user for identifying a video recording which said first user desires to have transferred from said first partition area to said shared partition area; and
   a processing system operable in response to a user input for completing a transfer of only said identified video recording from said first partition area to said shared partition area, said input device being operable for enabling said first user to choose a selected video recording to be transferred, said input device being further operable for enabling said first user to identify another user to whom said selected video recording is to be transferred, said input device being further operable for enabling said first user to input a message to be associated with said selected video recording, and said input device being further operable for enabling said first user to establish a save period, said save period being a time period said selected video recording is saved on said shared partition area before being deleted.

* * * * *